United States Patent

Brooks et al.

[11] Patent Number: 5,963,320
[45] Date of Patent: Oct. 5, 1999

[54] ACTIVE SPECTROMETER

[75] Inventors: Neil H. Brooks, San Diego, Calif.; Sergey N. Tugarinov, Troitsk, Russian Federation; Nicolae N. Naumenko, Minsk, Belarus; Torkil H. Jensen, Del Mar; Daniel Finkenthal, La Jolla, both of Calif.

[73] Assignee: General Atomics, San Diego, Calif.

[21] Appl. No.: 09/093,713

[22] Filed: Jun. 8, 1998

[51] Int. Cl.[6] .................................. G01J 3/06; G01J 3/18
[52] U.S. Cl. ............................................ 356/310; 356/328
[58] Field of Search ................................... 356/310, 326, 356/328, 330

[56] References Cited

U.S. PATENT DOCUMENTS

Re. 28,216  10/1974  Barringer et al. .................. 356/310

Primary Examiner—F. L. Evans
Attorney, Agent, or Firm—Fitch, Even, Tabin & Flannery

[57] ABSTRACT

A grating spectrometer employing digital control of an oscillating component (a mirror) and phase-locked digital recording of the intensity profile within the narrow spectral domain defined by an oscillation frequency. Flexible choice of oscillation frequency permits measurement in a quiet region of the noise spectrum. Reference waveforms acquired with the same insturment can be stored and later used to deconvolute a more complex spectrum. The use of multiple detector/slit combinations along a Rowland circle makes the spectrometer sensitive to specific atomic elements.

33 Claims, 10 Drawing Sheets

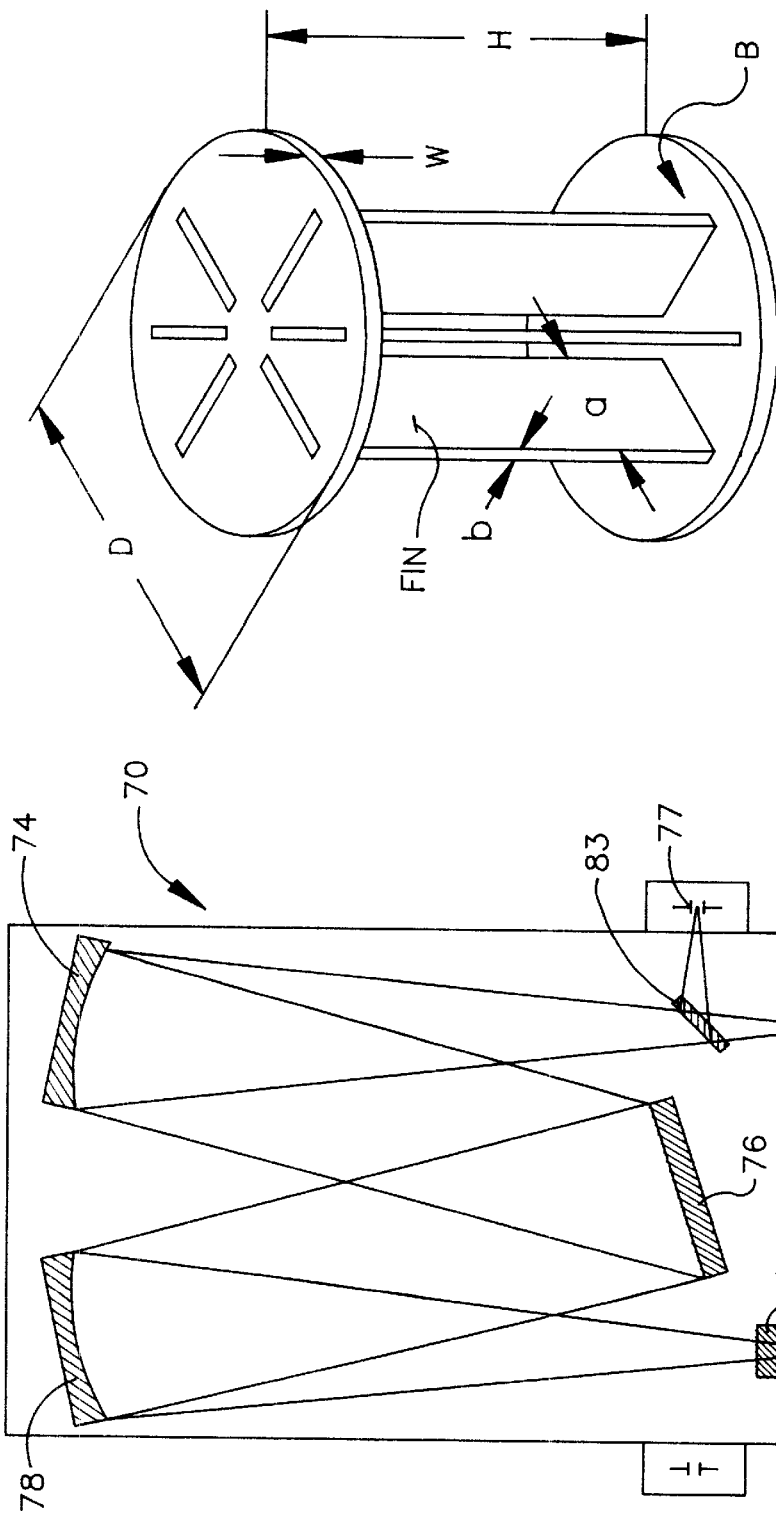

ACTIVE SPECTROMETER

BACKGROUND OF THE INVENTION

The present invention relates to optical spectroscopy, and more particularly, to an active spectrometer that performs spectroscopic analysis over a broad wavelength range with high resolution.

A spectrometer is an optical instrument that focuses light entering the spectrometer through a slit (entrance slit). The light is focused on a focal plane, and a location on the focal plane varies as a function of the frequency (or wavelength) of the light. A single frequency of light entering the slit will produce a single line on the focal plane, while multiple frequencies of light will produce multiple corresponding lines on the focal plane. Typically some variation in wavelength is present, and this in combination with instrumental imperfections, produces narrow wavelength bands rather than true lines (i.e., single wavelengths of light).

A typical high resolution spectrometer resolves incoming light into a large number of finely resolved wavelength bands. These wavelength bands are detected by a detector (or detector array) placed along the focal plane of the spectrometer. The spectrometer's spectral coverage is generally determined by the size of the spectrometer's detector (or detector array), and for a given detector size (detector array size), the spectrometer's resolution is generally determined by detector element, or pixel, width.

Detectors having large arrays of densely packed elements or pixels (i.e., large high-resolution detectors) necessarily generate large volumes of data and require significant computational resources to process this volume of data.

Spectroscopic detection of a particular chemical substance (or trace element) in a mixture of substances often involves discerning several relatively faint spectral lines, characteristic of the particular chemical substance, in the presence of nearby higher intensity spectral lines associated with the other substances in the mixture. Further, the particular substance's characteristic spectra may be distributed over a very large spectral range.

For example, the Balmer series spectra has significant spectral lines over the range of roughly 380 nanometers to exactly 656 nanometers. To detect the complete Balmer series would require sampling of many narrow wavelength bands over a broad spectral range resulting in the generation of a relatively large amount of data. Accordingly, intensive computational resources are often required to process and store the data generally associated with performing high-resolution chemical substance detection over a broad spectral range.

Accordingly, there exists a need for a high-resolution, broad-band spectrometer that uses relatively low-cost detectors and avoids the use of relatively large computational resources.

The present invention satisfies these and other needs.

SUMMARY OF THE INVENTION

The present invention satisfies these and other needs by providing an optical spectroscopy approach that performs spectroscopic analysis over a broad wavelength range with high resolution.

In one embodiment, the present invention can ve characterized as an apparatus for providing an electrical signal or a plurality of electrical signals representing a measurement of the spectral similarity between the emission spectrum from a light source and a reference spectrum. The apparatus employs an optical instrument that spectrally disperses the optical signal, in a dispersion direction that lies substantially in a dispersion plane, such that the signal's spectral components are projected and imaged onto an image region oriented perpendicular to the dispersion plane with the optical signal's spectral components resolved along the dispersion direction; a "template", herein defined as a plurality of transmissive slits which may be individual assemblies or part of a mask, that is located in the image region, wherein the slits are located along the dispersion direction at (i) positions that encode the reference spectra or (ii) at regularly-spaced intervals that span a continuous portion or the entirety of the image region; a driver that induces relative movement in the dispersion direction between the optical signal's imaged components in the image region and the template located in the image region, or visa versa; a plurality of electro-optical sensors, less than or equal in number to that of the transmissive slits, which are responsive to light from the optical signal's spectral components passing through the transmissive slits; each sensor provides an electrical signal representing the intensity of light passing through the transmissive slits optically coupled to that sensor; a plurality of signal conditioning circuits which (i) transmit the electrical signals generated by the electro-optical sensors faithfully over the frequency range $\omega$–$(N/2)\omega$, where $\omega$ is the frequency of the relative movement induced by the driver and $N\omega$ is the sampling frequency with which the analog signal is converted to a digital values, and (ii) attenuate the electrical signals outside this frequency range; and a digital control and data acquisition system containing (i) both output channels and input channels, the former of which are used to output a sinusoidal waveform at a frequency $\omega$ to the driver and the latter of which are used to sample at a frequency $N\omega$ the signals transmitted by the analog signal conditioning circuits and to store their digital conversions in memory, (ii) a single master clock to permit setting the ratio of sampling frequency and oscillation frequency, $N$, to an integral value with high precision, or separate master clocks for the output and input channels in which the period of their beat frequency is long compared with the duration of data collection with the active spectrometer, and (iii) a data processing capability wherewith the digitally stored data from successive periods at the driver frequency $\omega$ may be averaged together, thereby reducing the level of the noise relative to the that of the signal in the spectral interval spanned by the relative motion of the optical signal's imaged components in the image region and the template located in the image region.

In one variation, the image region is circularly curved and the optical signal's spectral components are imaged along an arc of the curved image region corresponding to the dispersion direction; and the slits in the template have a height as large as 10 millimeters perpendicular to the arc and may be distributed over a useful length of about 140 millimeters along the arc.

In a further variation, the image region is circularly curved and the optical signal's spectral components are imaged along an arc of the curved image region corresponding to the dispersion direction; and the slits in the template have a height as large as 10 millimeters perpendicular to the arc and may be distributed over the a useful length of about 250 millimeters along the arc.

In another variation the slits comprise the template have a width between 10 microns and 200 microns; and the oscillations of a planar deflection mirror (or of any other optical component of the spectrometer which might, by way of example, include the entrance slit, the grating, or a refractor plate) displace the imaged spectral components with respect to the slits of the template over a distance between one and a hundred times the slits comprising the template.

In an additional variation, the driver comprises (i) a torsion column, (ii) a platform mounted on the torsion column including an inertia ring that largely defines the resonant frequency of the system of platform and torsion column, (iii) a template mounted on the platform, and (iv) an electro-mechanical vibrator attached to the platform for oscillating the template at the resonant frequency of the torsion column/platform system; the slits comprising the template have a width between 10 microns and 200 microns; and the oscillations of the platform move the mask with respect to the imaged spectral components over a distance between one and a hundred times the slit width in the dispersion direction.

In yet another variation, the image region is flat and the optical signal's spectral components are imaged along a straight line of the flat image region corresponding to the dispersion direction; and the slits in the template have a height perpendicular to the straight line as large as (i) 50 millimeters in the case of curved slits and (ii) 20 millimeters in the case of straight slits and may be distributed across a useful focal plane width of a 10 to 20 millimeters; and the driver comprises a glass refractor plate or a planar mirror located within the optical instrument in a path of the optical signal; and oscillations in the angle of the plate with respect to the optical signal's path displaces the imaged spectral components, along the dispersion direction, with respect to a template.

In yet a further variation, a plurality of sources are imaged on, or fiberoptically coupled to the entrance slit such that the light from the several sources is distributed spatially along the height of the slit, and the imaged spectral components due to each of the several sources is optically coupled to a set of sensors, the analog electrical signals of which are independently conditioned and recorded by the data acquisition system.

In a further additional variation, an existing Rowland circle instrument may be converted into an active spectrometer by the addition of an external entrance slit, imaging optics, oscillating mirror, and coherent fiberoptic wedge.

In another further embodiment, the reference spectrum (or spectra) is acquired through the same spectrometer and is digitally stored in its data acquisition system, thereby incorporating (i) the convolution of the spectrometer's instrumental profile with the intrinsic profiles of the emission features in the source and (ii) the relative intensities, corrected for the spectrometer's wavelength-dependent response function, of emission features in the source that fall within the spectral scan range of the oscillation and (iii) the relative intensities, corrected for the spectrometer's wavelength-dependent response function, of emission features in the source that are detected by a plurality of sensors coupled to slits that may be widely separated in wavelength, and a least-squares fit of the digitally stored spectrum to the measured data is performed to find the concentration of a sought element in the spectrum of a light source.

In yet another embodiment, the present invention can be characterized as an active spectrometer. The active spectrometer has a diffraction grating; a focal plane defined by an emission spectrum diffracted from the diffraction grating in response to light directed onto the diffraction grating; means for defining a target spectrum comprising wavelengths of light associated with at least one target substance; means for inducing a relative oscillatory movement in a dispersion direction between the means for defining a target spectrum and the emission spectrum, the relative oscillatory movement being at a first oscillation frequency; a detector position receiving light at the focal plane; an analog-to-digital converter, coupled to the detector position, sampling light received at the detector position, the sampling being at second oscillation frequency, wherein the second oscillation frequency is an integral multiple of the first oscillation frequency.

In yet a further embodiment, the present invention can be characterized as a method of active spectrometry having steps of diffracting light; defining a focal plane with an emission spectrum diffracted from the diffraction grating in response to the light; defining a target spectrum comprising wavelengths of light associated with at least one target substance; inducing a relative oscillatory movement in a dispersion direction between the target spectrum and the emission spectrum, the relative oscillatory movement being at a first oscillation frequency; detecting light of the emission spectrum at a detector position at the focal plane; and sampling light received at the detector position, the sampling being at second oscillation frequency, wherein the second oscillation frequency is an integral multiple of the first oscillation frequency.

BRIEF DESCRIPTION OF THE DRAWINGS

The above and other aspects, features and advantages of the present invention will be more apparent from the following more particular description thereof, presented in conjunction with the following drawings wherein:

FIG. 9 is a top plan view of yet another additional embodiment of the active spectrometer of FIG. 1 illustrating an internal retrofit of an existing Czerny-Turner, or Fastie-Ebert, monochronometer in order to implement active spectrometer features therein; and FIG. 10 is a perspective view of an exemplary torsion column that may be used to oscillate a template (or mask) in a focal plane of a Rowland circle spectrometer presented in FIG. 1.

Corresponding reference characters indicate corresponding components throughout the several views of the drawings.

DETAILED DESCRIPTION OF THE PREFERRED EMBODIMENTS

Figure 1:
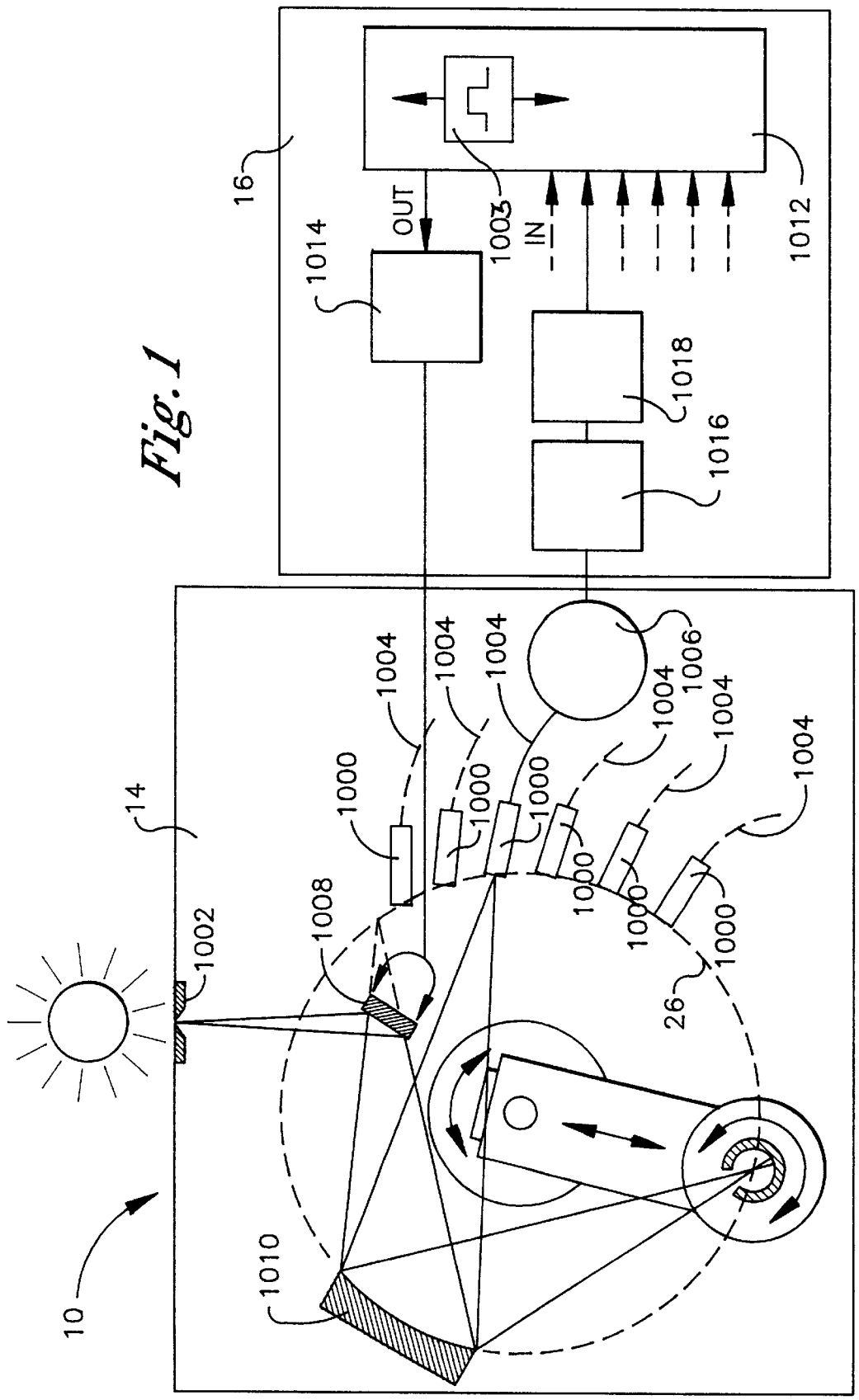
FIG. 1 is a top plan view of a Rowland circle active spectrometer in which a mirror scanner, located between an entrance slit and a grating, is utilized to oscillate a focal plane spectrum relative to a number of individual exit slits positioned at locations corresponding to spectral lines of a particular substance, with each slit optically coupled to a detector.

The following description is of several embodiments of the present invention including the best mode presently contemplated for carrying out the invention. This description is not to be taken in a limiting sense, but is made merely for the purpose of describing the general principles of the invention. The scope of the invention should be determined with reference to the claims.

An "active" spectrometer, as used herein, is a spectrometer in which an oscillation is induced in a dispersion direction between a focal plane image of the spectrum and a template located in a focal plane.

By way of example, that template may be a mask having a slit or slits therein at locations at which wavelength bands of a particular sought spectrum are located; that template may be one or more discrete slits positioned along the focal plane or at wavelength bands of a particular sought spectrum; that template may be a mask with slits regularly spaced along the focal plane an array of discrete slits positioned along the focal plane with the sought spectrum being, for example, digitally stored in a processing device, such as a computer. The relative oscillation between spectrum and template has an amplitude that is larger than the width of the characteristic features of the sought spectrum.

The oscillation can be accomplished in many ways. By way of example, the oscillation of the focal plane image can be accomplished using an oscillating mirror or refractor plate somewhere in the optical path, or by oscillating the location of the entrance slit, either mechanically or optically.

Alternatively, the template may be oscillated relative to a spectrum fixed in space by mounting the template on a torsion column driven at its resonant frequency.

The output from the active spectrometer of the present embodiment is not just light detector signal, but some correlation of the light detector signal and a signal describing the (oscillatory) displacement of the entrance slit image.

In the past such correlations were formed in an analog fashion using lock-in amplifiers. See U.S. pat. application Ser. No. 08/838,298, filed Apr. 16, 1997 for CORRELATION SPECTROMETER WITH HIGH-RESOLUTION, BROAD-BAND OPTICAL CHARACTERISTICS, incorporated herein by reference. Advantageously the present approach obtains correlations digitally utilizing, for example, a processing device, such as a computer. The digital technique provides great flexibility in choosing the correlation which is most favorable.

Two advantages of the active spectrometer relative to a conventional, non-active spectrometer are: i) noise suppression, i.e., increased sensitivity, and ii) rejection of broadband spectral features (white light) by using ac coupling of the detectors to the amplifier. This allows for a large gain without saturating the amplifier.

i) For a measurement lasting the time T, an output signal of a non-active spectrometer will contain the desired signal and noise of the system (due primarily to the light source and to the detector) in a frequency band of width $\Delta\omega \sim 1/T$ around the frequency $\omega=0$. For an active spectrometer, the correlation obtained contains likewise the desired signal and the noise of the system in the band $\Delta\omega \sim 1T$, but at the oscillation frequency $\omega$. The possibility of selecting the oscillation frequency makes it possible to minimize the noise detected. Often noise is most prominent near $\omega=0$ and at the frequency and the harmonics of the electric power grid.

ii) When detection of a narrow spectral feature (such as a spectral line) located in a region of intense broadband (white) light is desired, the active spectrometer allows for ac coupling of the light detector to the amplifiers. Thereby, one discriminates against the dc contribution from broadband light and this reduction in signal strength confers the benefit that a large gain can be used without saturating of the amplifier.

Referring to FIG. 1, a high-resolution active spectrometer 10 and related method are shown in accordance with one embodiment of the present invention. The embodiment shown provides as outputs several electrical signals representing, over a broad spectral range, the similarity between a reference spectrum and the spectrum of an optical signal from a light source.

The high-resolution spectrometer 10 is based on a survey spectrometer (See, for example, U.S. Pat. No. 5,675,411, Brooks, et al., issued Oct. 7, 1997 for BROAD-BAND SPECTROMETER WITH HIGH RESOLUTION, also incorporated herein by reference) and correlation spectrometer (U.S. Pat. Ser. No. 08/838,298 previously incorporated herein by reference) that use a Rowland circle design to provide a high optical throughput and a significant improvement in optical performance over flat-field spectrometer approaches. The active spectrometer 10 in FIG. 1 shares the same optical characteristics as those of the survey spectrometer, since it utilizes the same aberration-corrected holographic grating and Rowland circle design.

The embodiment of the active spectrometer shown, in variations, offers at least four major enhancements over prior art devices: (a) use of a focal plane template to detect multiple lines simultaneously that may be widely spaced in wavelength; (b) stigmatic imaging; (c) oscillation in the dispersion direction of the spectrum relative to a focal plane template by means of a mirror scanner; and (d) digital-based, lock-in detection of a signal associated with the (mechanical) oscillation frequency. These enhancements either individually or in combinations appear in variations of the present embodiment described herein.

The active spectrometer 10 includes an optical instrument 14 and a digital data acquisition/control system 16. Focusing for the present on the optical instrument 14, light enters the optical instrument 12 through an entrance slit 2 and is deflected by a mirror scanner 4 (a planar mirror mounted on a galvanometer drive) toward a concave diffraction grating 5. Mounted in the curved image plane 26 is a array of exit slits, each slit 6 coupled by a fiberoptic ribbon 7 to a photomultiplier 8. Sinusoidal oscillation of the mirror scanner 4 causes the focal plane image 26 of the spectrum to move back and forth in the dispersion direction relative to the array of fixed slits. As a consequence, the wavelength of light passed by each of the slits 6 is modulated at the mechanical oscillation frequency of the mirror scanner 4. Thus, the photomultiplier signal is proportional to the light intensity at the wavelength which is oscillating in time.

The digital data acquisition/control system 16 consists of a high pass filter 9, a current-to-voltage amplifier 10 and a multifunction, data acquisition board (DAQ) 11 containing both analog input and analog output channels. The DAQ board resides in a personal computer (PC). This DAQ board is used both to acquire the electrical signals from the photomultipliers and to drive the mirror oscillation. For the latter function, the DAQ board outputs a low-level sinusoidal waveform that gets routed through an audio amplifier 12 to the mirror scanner 4. The frequency with which the analog electrical inputs are sampled by the digitizer (analog-to-digital converter) in the DAQ board is an integral multiple of the output signal frequency used to drive the mirror scanner.

The integer ratio between the sampling frequency and the mirror drive frequency results in a phase locking of their respective periods, allowing for a simple analysis of the data, namely, averaging together of data from successive mirror scans to reduce the level of the noise relative to the signal. The synchronization described above requires reference of the output and input channels in the DAQ board to a single master clock or oscillator, or to two separate clocks (typically, quartz crystal oscillators) with a period for their beat frequency that is long compared with the duration of the measurements contemplated with the active spectrometer.

The use of digital techniques allows for much more detailed analysis than was possible with traditional lock-in amplifiers, out of which typically only two numbers were obtained, namely a Fourier amplitude and a phase. A set of basis function is chosen, $b(\Delta\lambda,\tau)$, which are functions only of the displacement of the focal plane image of the entrance slit, $\Delta\lambda$, and some other parameter, $\tau$. Letting the light detector signal be $s(t)$, where t is time, the correlation function is $$C(\tau) = \frac{1}{T}\int_0^T b[\Delta\lambda(t), \tau]s(t)dt. \qquad (1)$$

Here T is the time of the measurement. Typically, $\Delta\lambda,\tau=\Delta\lambda_o \cos(\omega t+\theta)$, where $\omega$ is the oscillation frequency. For conventional lock-in amplifiers, one uses.

$$b[\Delta\lambda(t), 1] = \Delta\lambda(t);\ b[\Delta\lambda(t), 2] \ge \Delta\lambda\left(t - \frac{\pi}{2\omega}\right) \qquad (2)$$

i.e., one measures the cosine and sine transforms of the detector signal.

With digital techniques new possibilities are opened up. As an example, one may use $$b[\Delta\lambda(t), \tau]=\delta[\Delta\lambda(t)-\tau]. \qquad (3)$$

In this case, the correlation function, $C(\pi)$, becomes the time averaged detector signal as a function of the image displacement.

The digital analog of the analytic prescription by Eqs. (1) and (3) becomes particularly easy to implement when the oscillation period $(2\pi/\omega)$ is an integer multiple of the sampling time, $\Delta t$, of the detector signal, $s(t)$, i.e., $2\pi/(\omega_o\Delta t)=N$. Letting $$s_\nu=s(\nu\Delta t), \qquad (4)$$

where the subscript $\nu$ is defined here for later reference as the "phase index" within a mirror scan period, one sees that $$C(0) = s_0 + s_N + s_{2N} + \ldots \qquad (5)$$

$$C(1) = s_1 + s_{1+N} + s_{1+2N} + \ldots$$

$$\vdots$$

$$C(N-1) = s_{N-1} + s_{2N-1} + s_{3N-1} + \ldots$$

For this case the output consists of N numbers, so when N>>1 the output approaches a continuous function, $C(i)$, i=1, 2, . . . N.

Figure 3:
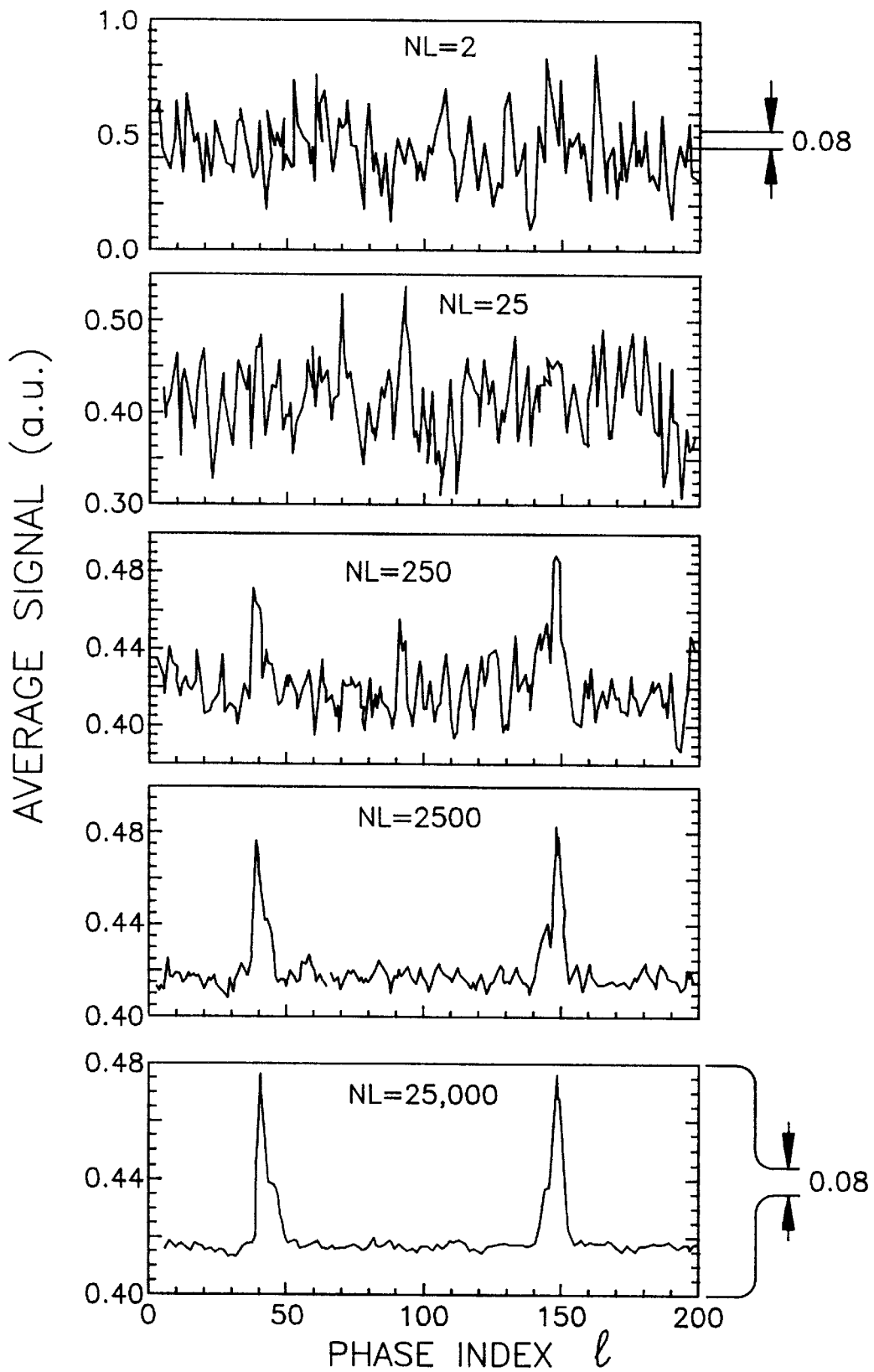
FIG. 3 is a series of graphs illustrating a reduction in noise level obtained by averaging data from successive mirror scans such as may be recorded by the active spectrometer of FIG. 1 wherein the series of graphs (from top to bottom) shows an increasing signal to noise ratio of average signal strength (S) (on the ordinate), versus phase index (1) (on the abscissa), of a measured output for a deuterium Geissler tube.
Figure 4:
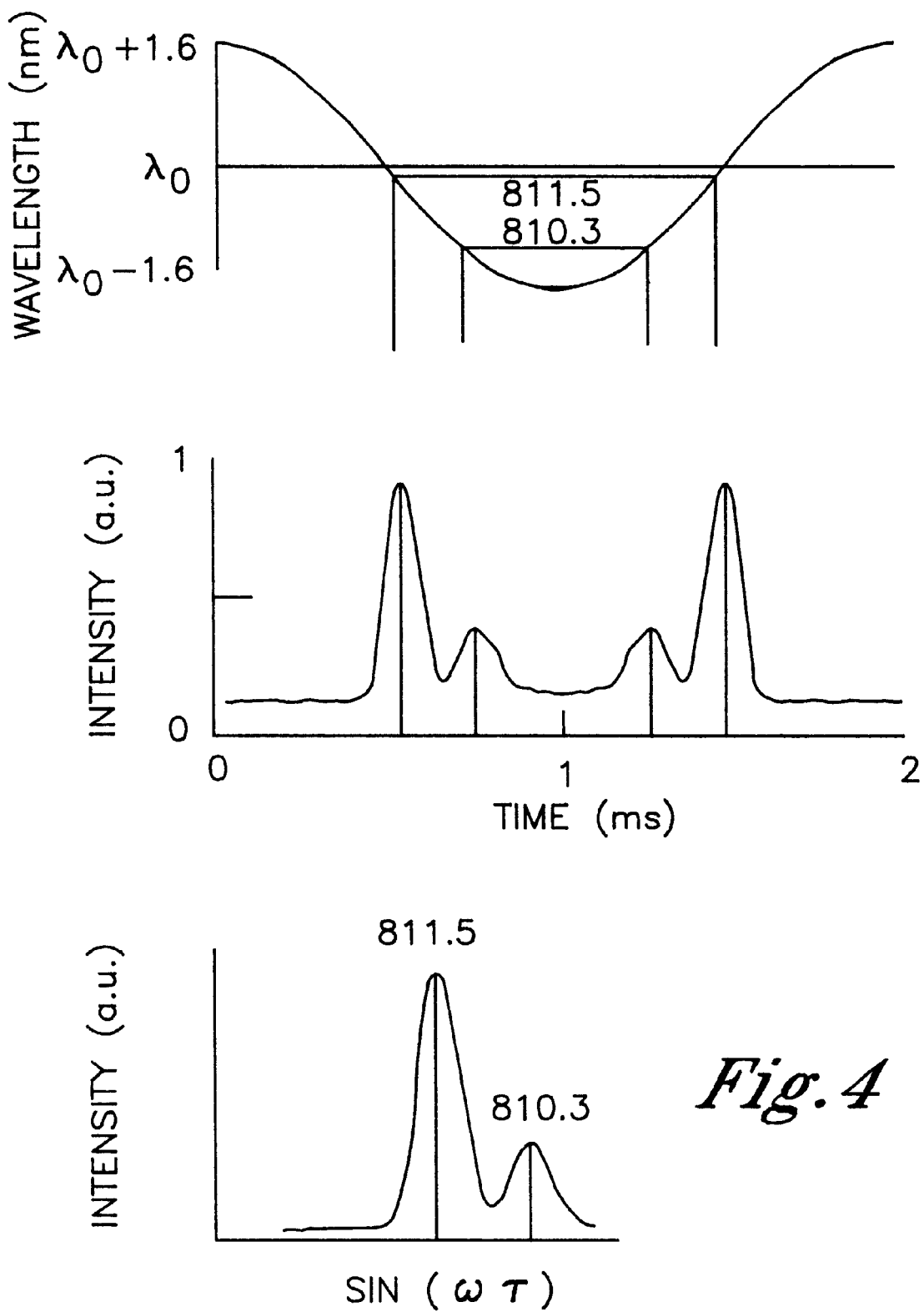
FIG. 4 is a series of graphs relating to signals recorded by an "argon" detector for channel with an exit slit centered at 811 nanometers for light emitted from a Penning gauge with pure argon fill, wherein in an exemplary application of the active spectrometer of FIG. 1 an upper curve shows wavelength (on the ordinate) of light transmitted through the exit slit, versus time (on the abscissa), a middle curve shows intensity of light (on the ordinate) of light transmitted through the same said slit, versus time (on the abscissa), and a lower curve shows intensity (on the ordinate) of light transmitted through the exit slit, versus $\sin(\omega t)$ (on the abscissa), illustrating removal of asymmetry when intensity is plotted against $\sin(\omega t)$.

For the laboratory test analyzed in FIG. 3 we used $\omega=2\pi\times 250$ sec$^{-1}$ and $1/\Delta t=5\times 10^4$ sec$^{-1}$, so that N=200; for the laboratory tests analyzed in FIGS. 4 and 6 $\omega=2\pi\times 500$ sec$^{-1}$ and $1/\Delta t=5\times 10^4$ sec$^{-1}$, so that N=100.

Figure 2:
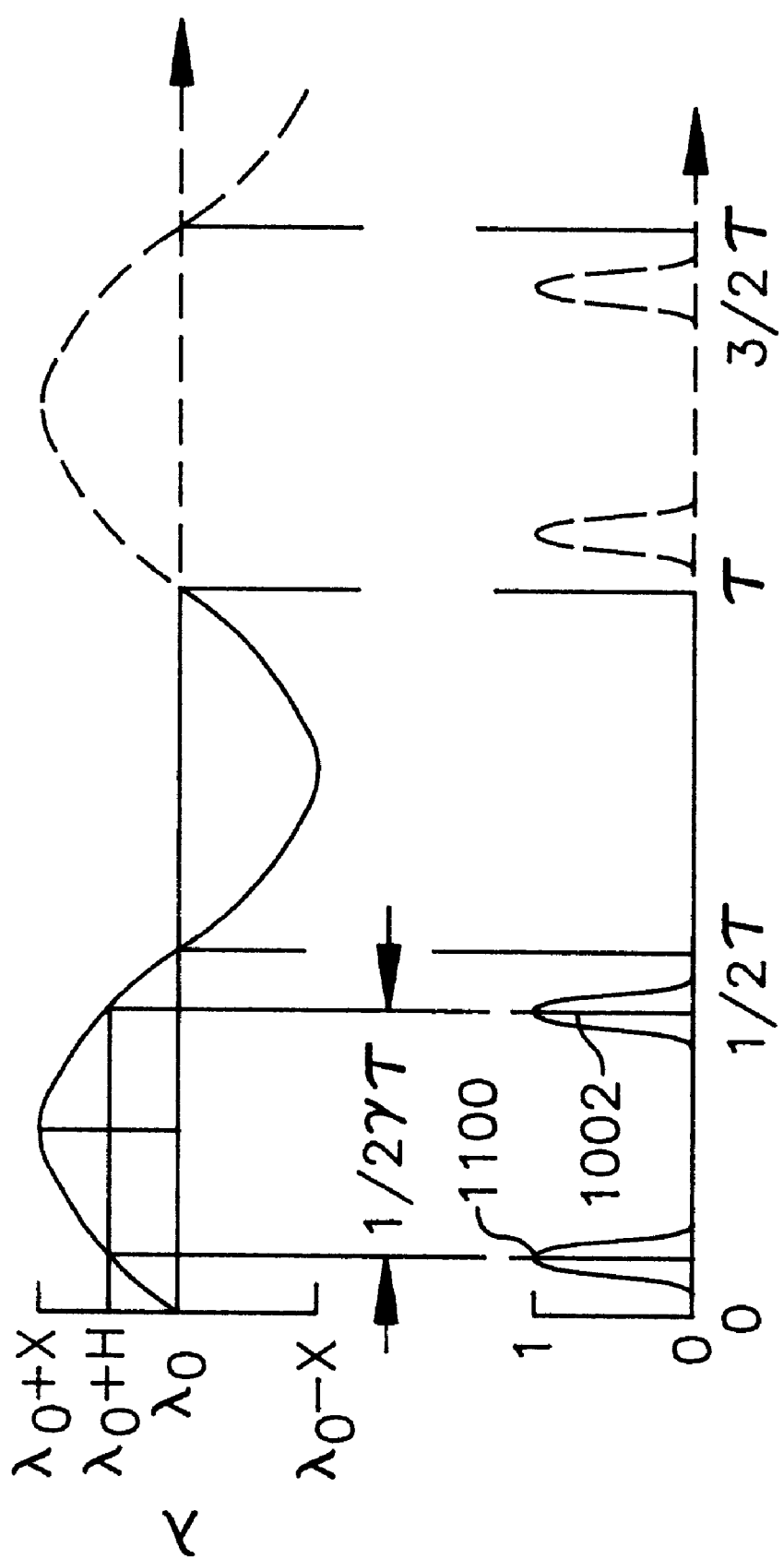
FIG. 2 is a graph depicting a correlation in time between wavelength and intensity of light passing through an exit slit such as in the active spectrometer of FIG. 1 wherein the upper curve shows wavelength of light transmitted through an exit slit (on the ordinate) versus time (on the abscissa), and wherein a lower curve shows intensity of light detected through the exit slit (on the ordinate), verses time (on the abscissa)

FIG. 2 illustrates the expected intensity of the light from a single emission line passed by an individual exit slit 6 in FIG. 1. The top trace shows the wavelength of light transmitted through the exit slit as a function of time t. This is well approximated by $$\lambda(t)=\lambda_o+a \sin(2\pi t/T), \qquad (6)$$

where $\lambda$ is the central wavelength about which the transmitted wavelength swings sinusoidoally with amplitude a. The lower part of the figure shows a photomultiplier signal, S(t), resulting from a light source with a single line at $\lambda=\lambda_o+h$; h is termed the line displacement. The ratio of the line displacement h and the image oscillation amplitude a is readily seen to be $$\frac{h}{a} = \sin\left(\pi \frac{1-\gamma}{2}\right), \quad (7)$$

where $\gamma$ is the measured quantity. As seen graphically in FIG. 2, the ratio $\gamma$ is just the fraction of an oscillatory half cycle separating the two peaks due to the fictitious line.

Referring to FIG. 3, a series of graphs is shown which illustrate the noise suppression capabilities of the instrument. For the data displayed here, a neutral density filter was inserted between the light source (deuterium-filled, Geissler discharge tube) and the spectrometer entrance slit, such that the shot noise of the photomultiplier dark current becomes significant. This data was taken with both the entrance and exit slits set to a width of 20 microns, so as to give sufficient spectral resolution to separate the $D_\alpha$ (656.10 nm) and $H_\alpha$ (656.28 nm) line emission of the deuterium Geissler tube (these tubes typically contain some hydrogen as well.) The average output signals $<S>^1$, on the ordinate, are plotted versus scan phase index for various numbers of mirror scan periods N/L, namely 2, 25, 250, 2,500, and 25,000.

Here N is the total number of data samples in the data set for each box in the figure and L is the number of sample points within a single mirror scan cycle (200). Note that the ordinate scale decreases by a factor of 12 from the top trace (N/L=2) to the bottom (N/L=25,000). One clearly sees the improvement of the signal-to-noise ratio as the number of periods N/L is increased.

Returning to FIG. 1 to elaborate on the high pass filter 9 and current-to-voltage amplifier 10 employed conditioning of the analog signal inputs to the digital data acquisition system 16, the high pass filter makes possible the rejection of broadband radiation, i.e., white light or continuum. Whereas the intensity of line radiation passing through an exit slit 6 is modulated at the mirror oscillation frequency, the intensity of broadband radiation is not. Ac coupling therefore blocks (or subtracts) this dc component from the detector signal reaching the amplifier 10. The same result may be achieved without a separate high pass filter 9, by restricting the frequency response of the amplifier 10. For the digital lock-in technique employed in the active spectrometer, the amplifier need only be sensitive to frequencies in the range $\omega-(N/2)\omega$, where $\omega$ is the mechanical oscillation frequency and $(N/2)\omega$ is half the sampling frequency of the DAQ board for a single analog input channel.

By setting the upper limit of the amplifier's frequency response at half the sampling frequency, aliasing on signal spikes associated with high frequency noise is avoided. The upper limit, $(N/2)\omega$, of the amplifier response may be incorporated internal to the amplifier itself, or externally, as a integrator in the electrical path between the detector 8 and the amplifier 10. Custom design of the amplifier to perform the role of high pass filter and anti-aliasing integrator is particularly attractive when photodiodes are used as the detector 8. In this case, the frequency response may be incorporated into a preamplifier circuit that is close-coupled to the photodiode.

In addition to noise suppression through scan-averaging and continuum rejection by ac signal coupling, the digital data acquisition system of the active spectrometer makes possible the use of reference spectra to perform least-squares fitting of a simulated spectrum to measured data. The capability to utilize digitally stored reference spectra taken from the light source under study through the spectrometer system that will be used to determine the presence and concentration of some trace constituent is a very powerful tool. Not only do measured reference spectra incorporate the convolution of the instrumental profile with the intrinsic line profile of the light source, but they also contain the relative intensities in that light source of multiple lines falling within the active spectrometer's wavelength scan as detected with the wavelength dependent response function of the active spectrometer. This latter feature of the active spectrometer may be used advantageously in the case of an impurity that has an emission pattern with spectral lines in multiple detector channels.

Reference spectra for all those channels may be combined into a superset that is least-squares-fit simultaneously to a superset of measured data from those multiple detector channels. Such a "super" fit constrains the solution (for the concentration of the unknown element) much more severely than the fit to a single channel, because the intensity of the lines in the several channels must match the relative intensities of those same lines recorded in the reference spectra.

In the prior art of correlation spectrometers, the use of reference spectra has been restricted to analog methods that were relatively inconvenient to implement and which did not incorporate the actual instrumental profile of the spectrometer used for the actual measurements (see U.S. Pat. No. 3,594,083 by A. R. Barringer, by way of example). The application of the active spectrometer in FIG. 1 to partial pressure measurements of neutral gas in a Penning gauge illustrates the use of digitally stored reference spectra to extract information from data in which sizable detector shot noise prevents the eye from discerning the shape of the spectrum within the narrow wavelength scan range of a single detector channel. Nevertheless, a fit to the noisy data constrained in the form of a linear superposition of digitally stored reference spectra permits an accurate determination of a constituent with unknown concentration.

Optical detection in a commercial Penning gauge of the characteristic atomic line emission produced by electron excitation has been employed to deduce the concentrations of these gases in the diverter plenum of several tokamaks. The sensitivity of the Penning gauge technique is limited by contamination of the measured signal with light from molecular deuterium, the vibrational-rotational spectrum of which forms a quasi-continuum at resolutions greater than 0.1 nm. When bandpass filters are used in the visible range, more light from molecular deuterium than from the gas of interest may pass through the chosen spectral bandpass. This background may be canceled out by differential measurement of the signals in two close-lying spectral windows. Though this technique works well for gases with a single bright atomic line or atomic multiplet, it does little to improve the sensitivity limit for neon, a gas for which the atomic spectrum is comprised of numerous lines, with no single one dominant. The Penning gauge system on the lower diverter of the DIII-D tokamak has a detection limit for neon of $5 \times 10^{-5}$ bar, compared with $2\times10^{-6}$ bar for helium and $1\times10^{-8}$ bar for argon.

In order to improve sensitivity to neon, the active spectrometer shown in FIG. 1 has been applied to detection of the light produced in the Penning gauge. The active spectrometer repetitively scans a narrow spectral region at high resolution, permitting observation of a given emission line and its adjacent spectral background. For the case of a trace amount of neon in deuterium, measurement of the neon partial pressure is feasible even when the intensity of the neon emission is only a small fraction of that from molecular deuterium integrated over the width of the spectral scan region.

For this application to measurement of partial pressures in a Penning gauge, the entrance and exit slits are both set to 100 mm, giving a triangular instrumental profile with a full width, half maximum (FWHM) of roughly 0.3 nm. This FWHM represents a tradeoff between optimizing spectral resolution and maximizing light throughput. A fiberoptic ribbon 200 $\mu$ wide couples each slit to a separate photomultiplier (PMT). To obtain high quantum efficiency in the red region of the spectrum, side-on phototubes with opaque GaAs photocathodes are employed. The slits are positioned to detect the brightest lines of neutral deuterium, helium, neon, argon and krypton lying between 400 and 850 nm, with three of the slits located so as to detect lines from two different elements during the 3 nm-wide spectral scan of the spectrometer. Table I below lists the lines encompassed by each of the six channels.

TABLE I

| | Six detector channels of active spectrometer | | | |
|---|---|---|---|---|
| No. | Center Wavelength (nm) | Spectral Lines in Scan Range | | |
| | | 1st Gas | 2nd Gas | 3rd Gas |
| 1 | 486 | D I 486.0 | | |
| 2 | 587 | Ne I 585.3 | | |
| | | Ne I 587.3 | | |
| 3 | 640 | Ne I 638.3 | | |
| | | Ne I 640.3 | | |
| 4 | 656 | D I 656.1 | | |
| 5 | 705 | Ne I 703.2 | He I 706.5 | |
| 6 | 811 | Ar I 810.3 | Kr I 810.4 | Ne I 811.8 |
| | | Ar I 811.5 | Kr I 811.3 | Ne I 812.9 |

FIG. 4 shows average intensity versus time or "phase index" of the argon detector (channel 6 in Table I) with pure argon gas fill in the Penning gauge. In each scan of the mirror, the wavelength of the light passed by the exit slit varies sinusoidally. Consequently, each component of the Ar I multiplet appears twice, once during the negative going sweep in wavelength and once during the positive-going. Since wavelength changes more slowly at the top and the bottom of the sine curve, the spectral line profiles of lines close to the wavelength of the mirror turning points are asymmetric. The Ar I 810.3 line profiles are clearly stretched out on the short wavelength side, closest to the mirror turning points. In FIG. 2(b), the intensity is replotted versus wavelength by replacing the independent coordinate t (or phase index) by sin ($\omega$t). Within the accuracy of the display, both the 810.3 and 811.5 lines appear symmetric. The intensity trace displayed in FIG. 2 is the result of averaging 5,000 mirror scans (10 sec).

Figure 5:
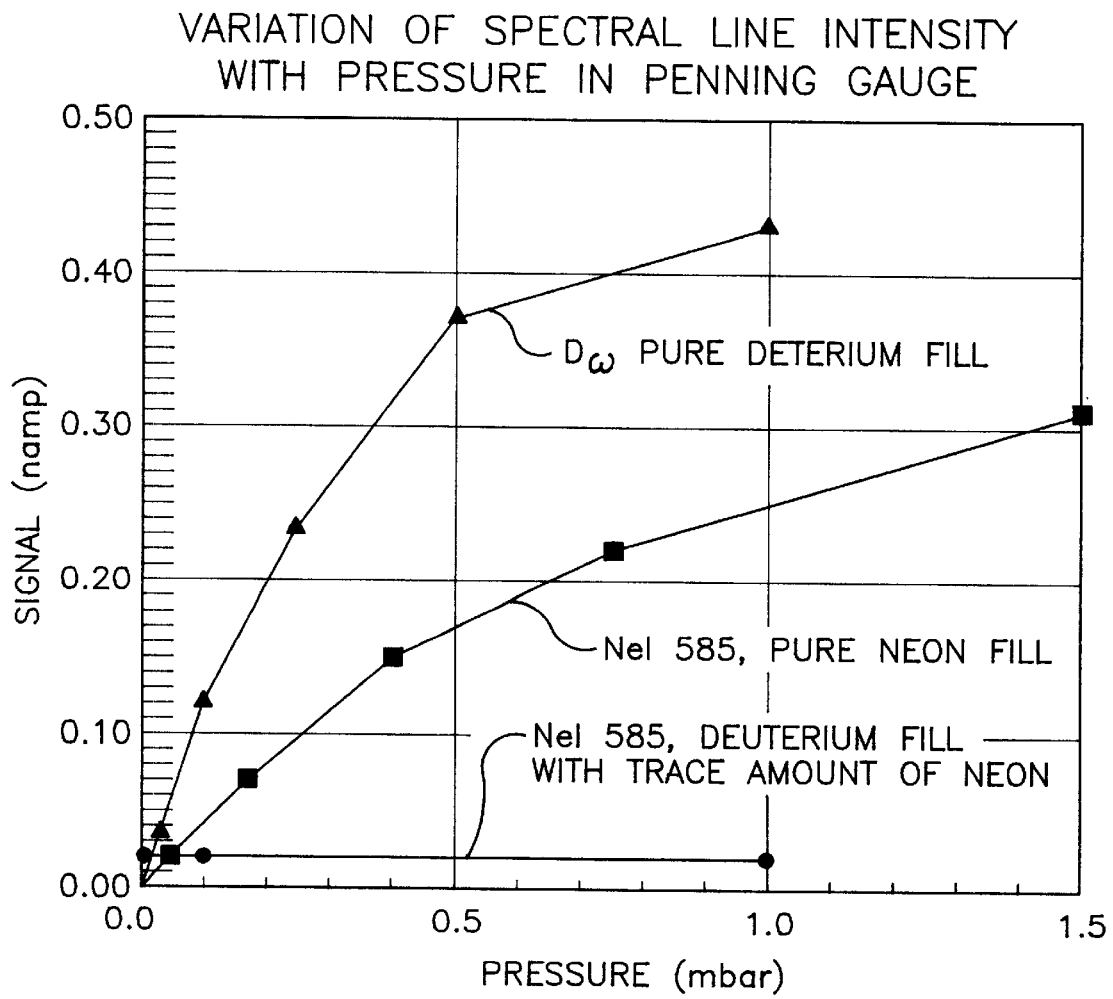
FIG. 5 is a graph of signal strength (on an ordinate), versus pressure (on the abscissa) in a Penning gauge light source, such as may be recorded within the active spectrometer of FIG. 1, showing pressure dependence of light emission Intensity of Ne I 585 line versus p(Ne), intensity of $D_\alpha$ versus $p(D_2)$, and intensity of Ne I 585 and $D_\alpha$ with p(Ne) fixed and $p(D_2)$ varied.

Dependence of light emission on fill pressure in the Penning gauge was first studied with pure gases. As shown in FIG. 5, the neon intensity on channel 1 increases monotonically with the fill pressure of pure neon over the pressure range from $1\times10^{-6}$ bar to $1.5\times10^{-3}$ bar. The $D_\alpha$ intensity on channel 3 increases with the pressure of pure deuterium in a similar fashion. In a mixture of neon and deuterium with the neon partial pressure fixed at $3\times10^{-5}$ bar, the neon intensity is constant as deuterium pressure is varied from $1\times10^{-6}$ bar $1\times10^{-3}$ bar.

Figure 6A:
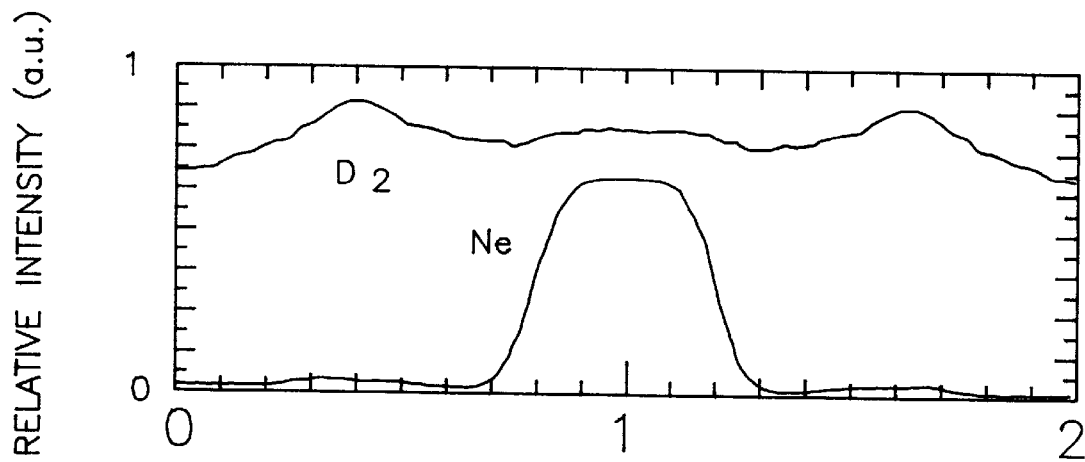
FIG. 6 is a graph of intensity (on the ordinate), versus time within a single scan period (on the abscissa), illustrating the use of Ne and $D_2$ reference spectra in the analysis of measured data from a Ne/$D_2$ mixture, such as in an exemplary application of the active spectrometer of FIG. 1, wherein the upper graph shows digitally stored intensity profiles of neon and molecular deuterium (on the ordinate) versus time (on the abscissa) within a scan period, to be used as reference spectra, the middle graph shows a least squares fit to measured data scan-averaged over 10 seconds of a linear superposition of Ne and $D_2$ reference spectra with intensity shown (on the ordinate) versus time (on the abscissa) and a lower graph shows a least squares fit to data scan-averaged over 0.1 sec of a linear superposition of Ne and $D_2$ reference spectra with intensity shown (on the ordinate) versus time (on an abscissa)

Small concentrations of neon in a mixture with deuterium may be accurately measured by fitting the shape of the composite spectrum produced by the limited spectral scan of the active spectrometer. FIG. 6 illustrates the procedure. Reference spectra for pure neon and pure deuterium are digitally recorded for the spectral region spanned by each neon channel. Only channel 1 is shown in FIG. 6(a). These spectra are recorded with low noise by averaging many mirrors scans. The neon trace in FIG. 6(a) represent 25,000 mirror scans (50 s); the deuterium trace 100,000 mirror scans (200 s). Both spectra were measured at a fill pressure of $1\times10^{-3}$ bar, this value being the pressure shown on the front panel meter of the Penning gauge controller without correction for the dependence of ion current on gas species. Note that the peaks in the deuterium spectrum are molecular features; atomic deuterium has no lines in this spectral range.

Figure 6B:
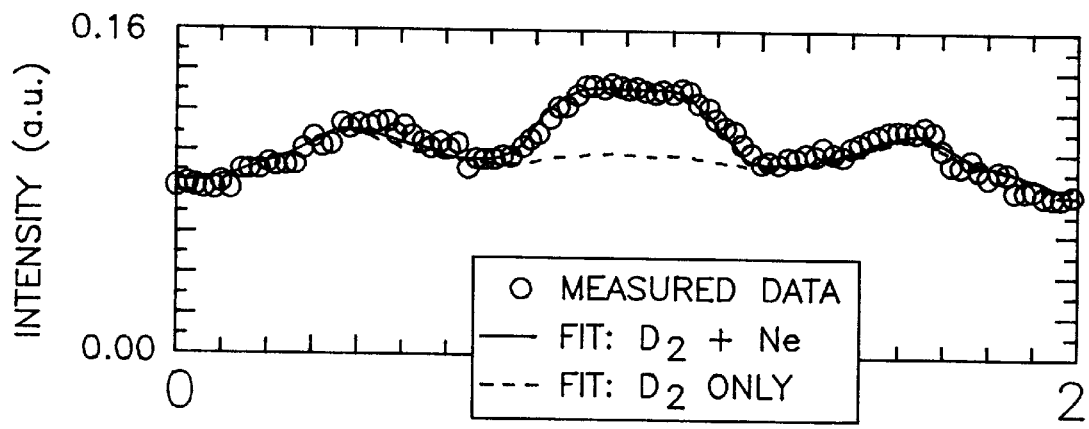
Figure 6C:
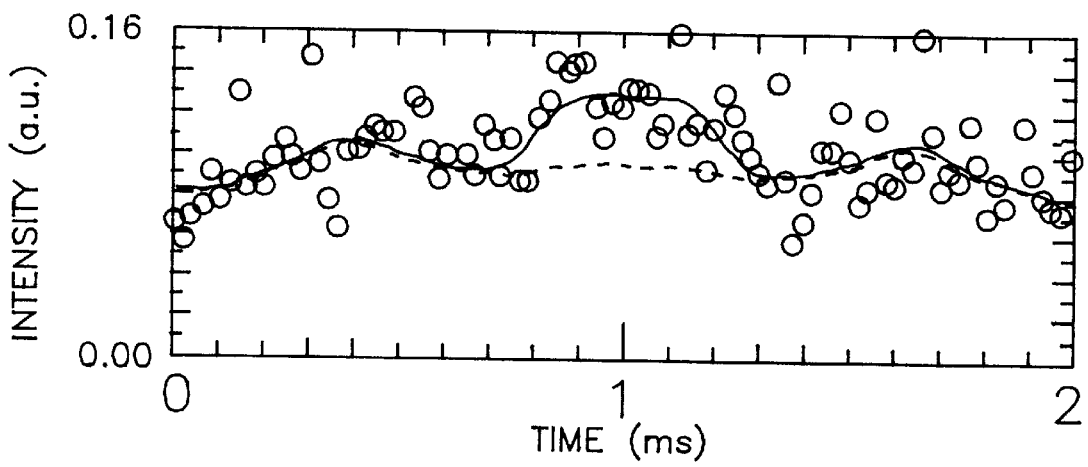

The composite spectrum due to an admixture of neon and deuterium is shown in FIG. 6(b); the data points represents an average over 5,000 mirror scans (10 s). A least squares fit to the measured data with a linear combination of the two reference spectrum yields a Ne/$D_2$ concentration ratio of 0.3% [p(neon)=$3.0\times10^{31\ 6}$ bar and p(deuterium)=$1.0\times10^{-3}$ bar]. The fit closely matches the measured data points. FIG. 6(c) shows a measurement of the same mixture averaged over only 50 mirror scans (0.1 s). Shot noise in the detector leads to a large scatter of the data points. Nevertheless, a least squares fit to that data gives a Ne/$D_2$ concentration of 0.3% and a partial pressure of neon that differs by only 6% from that deduced by fitting the smooth data obtained with 10 s integration.

Figure 7:
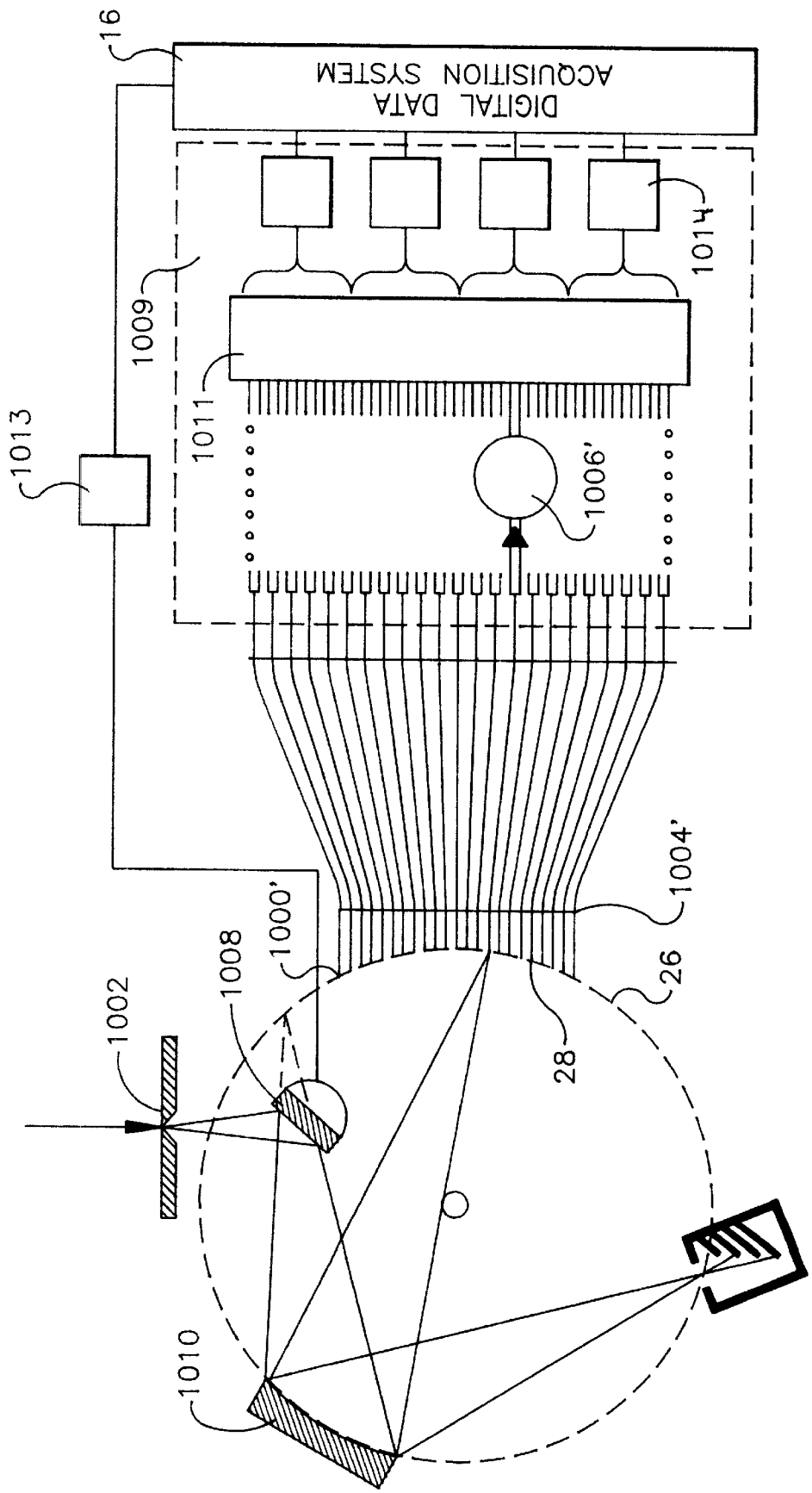
FIG. 7 is a top plan view of another additional alternative embodiment of the Rowland circle active spectrometer of FIG. 1 that includes a mask with regularly spaced slits spanning an entire useful length of a curved focal plane, with each slit in the mask optically coupled to a separate photodiode detector.

Referring to FIG. 7, a plan view is shown of a particular implementation of an alternate embodiment of the spectrometer of FIG. 1. In this embodiment the entire usable focal plane is spanned by a mask with regularly spaced slits and each slit is coupled, fiberoptically or otherwise, to a separate photodiode detector. In addition to the plurality of slits are shown a plurality of fiberoptic conductors leading from the slits to a detector board which contains all the photodiode detectors and associated signal conditioning circuitry. This circuitry includes a preamplifier which is restricted in its frequency response to the range $\omega-(N/2)\omega$to act both as a high pass filter and as an integrator which prevents aliasing of the digitizer on high frequency noise spikes.

In the way of example, the slits in the mask may be 50 microns wide on a center-to-center spacing of 1 mm. Then a scan amplitude greater than 0.5 mm will result in the overlap of the spectral scans obtained with the detectors coupled to adjacent slits. To provide continuous coverage of the spectrum from 400 nm to 800 nm, approximately 140 slits and a like number of detectors would be required. Digitizing the signals from all of the detectors would require more than one DAQ board and more than one PC.

It is therefore advantageous, in accordance with the present embodiment, to have an approach for selecting for digitization data from a subset of the photodiodes and being able to change the subset according to the location of the spectral lines in a particular characteristic line pattern sought for a given trace element. The output signals from the preamplifiers may be routed through analog switch multiplexers to a smaller number of secondary amplifiers. Preferentially, all of the preamplifiers, analog switch multiplexers and secondary amplifiers are configured for differential signal handling to minimize common mode noise in the signal that gets digitized. Use of the analog switch multiplexers enables flexibility in choosing the detectors whose signals are digitized; thereby, a different set of spectral lines may be recorded depending on the element being sought.

Another useful feature that may be included on the same printed circuit board with the detector circuitry is an amplifier for the sinusoidal drive signal to the mirror scanner which is capable of programmable dc offset.

It is desirable to be able to control the midpoint position of the mirror scan such that the wavelength corresponding to the midpoint, i.e., the wavelength of the light passing through the slit, is different from that with the mirror scanner unpowered (at rest). Initial alignment of the exit slits to specific wavelengths near to, but not coincident with lines of common laboratory light sources is facilitated by this feature.

Figure 7A:
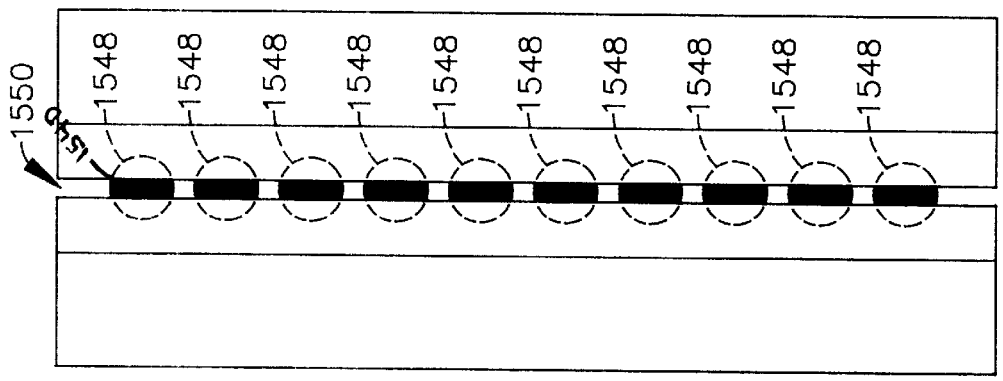
FIGS. 7A and 7B are partial side views of an entrance slit employable in the embodiments of FIGS. 1 and 7, showing a plurality of discrete light sources wherein the discrete light sources may be discrete optical fibers carrying light from a plurality of locations.
Figure 7B:
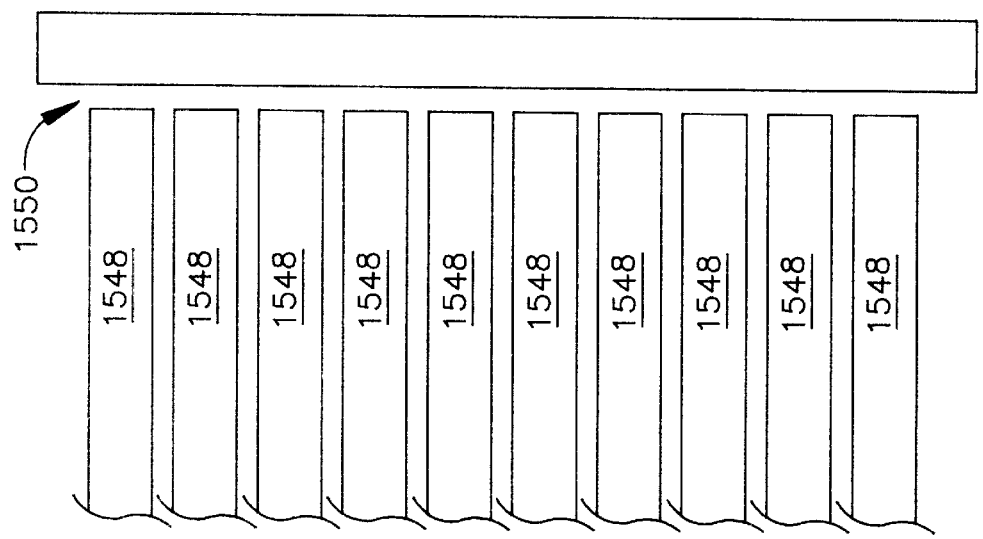

Another embodiment of the active spectrometer presented in FIGS. 1, 7, 9 and 10 is depicted in FIGS. 7A and 7B. In the embodiment of FIGS. 7A and 7B multiple light sources 1548 are imaged on the entrance slit 1550, or fiberoptically coupled to it, such that the light from the several sources is distributed spatially along the height of the slit. In FIGS. 7A and 7B an embodiment employing fiberoptically coupled light sources 1548 is illustrated with ten fibers butted against a face of the slit 1550. The focal plane image of the entrance slit 1550 illuminated by the multiple fibers consists of ten spectra, each limited in vertical extent by the stigmatic property of the aberration-corrected, holographic grating (FIGS. 1 and 7). If the aperture of the 70-mm-diameter grating is masked to a height of 40 mm, the image in the focal plane of a point source on the entrance slit is just 0.1 mm tall. For the full 70 mm aperture of the grating the vertical blur in the focal plane is only a few tenths of a millimeter. In the specific case illustrated in FIG. 7A and 7B, ten fibers 1548 are distributed over the full height of the 10 mm tall slit 1550 with a center-to-center spacing of 1 mm. For the purpose of example, the core diameter of each of the fibers is assumed to be 0.6 mm. The horizontal spectra in the focal plane from the ten fibers form ten horizontal bands spaced 1 mm apart vertically, center to center. Due to the presence of the small amount of vertical blurring described above, the image of each source in the focal plane is somewhat larger in vertical extent than the core diameter of the fiber at the entrance slit. In order to collect all the light in the image of each source, it is desirable to employ fibers, for example, with 0.8 mm or 1.0 mm core diameter butted against each exit slit and to utilize the same center-to-center spacing as that on the entrance slit. By routing each of these ten fibers to a separate spot detector, such as a photodiode or photomultiplier, light from each source at the entrance slit may be independently recorded. Alternatively, the light passing through each exit slit may be imaged onto a linear photodiode array with ten discrete elements that are read out in parallel.

Advantageously, in accordance with the approach described above, a single, Rowland circle, active spectrometer may do the duty of ten separate spectrometers, albeit with the limitation that the spectral analysis on the ten different sources performed by the active spectrometer will be the same for all sources. An ability to monitor ten sources in parallel can be utilized in many ways. For example, one can monitor ten sources in one lab or ten sources in a variety of labs and buildings; alternatively, monitor ten views can be monitored through a single light source. An attractive application of the latter capability is to measure the radial profile of electron temperature and density in a plasma column at ten points along the path of a neutral beam crossing that column. As explained by Y. Andrew et al., "Interpretative Modeling of JET's Thermal Helium Diagnostic," Proceedings of the 13th Plasma-Surface Interactions in Controlled Fusion Devices Conference, San Diego, Calif. USA (May 1988), incorporated herein by reference, the electron temperature and density may be deduced from the intensity ratios of three lines of atomic helium that are collisionally excited by electrons in the plasma column.

Figure 8:
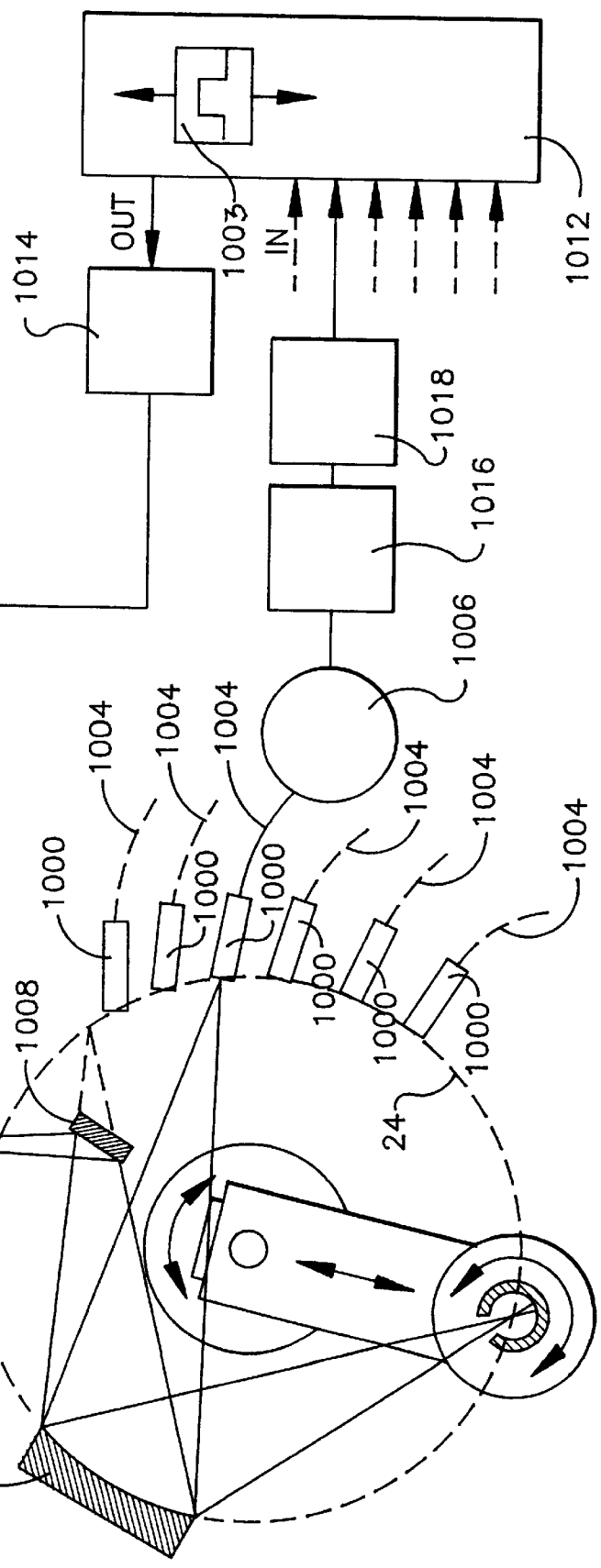
FIG. 8 is a top plan view of a further alternative embodiment of the Rowland circle spectrometer of FIG. 1 illustrating an external retrofit of an existing Rowland circle-type spectrometer in order to implement active spectrometer features therein.

Referring to FIG. 8, a top plan view is shown of a further alternative embodiment of the present invention illustrating an external retrofit of any existing Rowland circle-type spectrometer in order to implement active spectrometer aspects of the present invention.

As can be seen in FIG. 8, a retrofit assembly 1 consisting of an entrance slit 2, a concave mirror 3, a planar mirror scanner 4 and a coherent fiberoptic wedge window 5 are mounted external to the original entrance slit flange. The fiberoptic wedge replaces the original entrance slit of the Rowland circle spectrometer and the output face of the wedge is positioned tangent to the curve obtained upon reflection of the Rowland circle sector 6 about the face of mirror 20. If the image movement of the retrofit assembly is arranged tangent to the curve described above, the fiberoptic wedge is not needed. The same digital lock-in technique described for FIG. 1 may be applied to the embodiment of FIG. 8 by oscillation of the external mirror scanner 4.

A higher order approximation to tracking the curve of the Rowland circle may be achieved by placing a coherent fiberoptic transformer with cylindrical input and output faces between the entrance slit and the Rowland circle. The curvature of the coherent fiberoptic transformer's output face is matched to that of the reflected Rowland circle sector. The input face of the transformer is curved to match the surface in which the moving image of the entrance slit is focused. From an optical point of view, the entrance slit is still located on the Rowland circle. Its motion follows the curve of the Rowland circle identically, not the straight line tangent to that circle.

External retrofit of a Rowland circle spectrometer as described above increases the scan range over which focus is maintained, permitting the study of broad spectral features such as molecular bands and thermally broadened line profiles.

Referring to FIG. 9, a top plan view is shown of yet another further embodiment of the present invention illustrating an internal retrofit of an existing Czerny-Turner or Fastie-Ebert monochrometer in order to facilitate digitally based lock-in detection in accordance with the present invention. The methods presented here for oscillation of the spectrum in the focal plane have been used before in correlation spectrometers employing analog lock-in techniques (see U.S. Pat. No. 3,594,083). The Czerny-Turner-configuration monochrometer 70 includes an entrance slit 72, a collimating mirror 74, a flat diffraction grating 76, a focusing mirror 78, and an image plane 80. In this spectrometer configuration, the optical axis is oriented normal to the entrance slit, allowing good spectral resolution to be maintained while displacing the spectral image over a distance corresponding to a large excursion in wavelength. Spectral image oscillation may be induced using rotational oscillation of a thin glass or quartz plate 82 placed between the collimating mirror 78 and the exit slit 80. As the its angle with respect to the optical axis changes, the glass plate 82 displaces the image of the entrance slit in the focal plane by an equal displacement (assuming unity magnification between the source plane and the image plane). Alternatively, a plane mirror 83 may be placed between the dual entrance slit 77 and the collimating mirror 74. Oscillation of this mirror will also displace the image of the entrance slit in the focal plane.

Although a Czerny-Turner spectrometer configuration is described in FIG. 9, the approach illustrated may be readily implemented using similar high resolution spectrometers that employ a plane grating for diffracting and concave mirrors for collimating and focusing the light of the optical signal.

Referring to FIG. 10, an exemplary torsion column is shown which may be placed over the center of the Rowland circle in the spectrometer of FIG. 1 and used to oscillate a mask in the focal plane in an alternate embodiment of the invention. As was stated previously herein, the spectrum may be oscillated in the dispersion direction relative to a multislit template (variously interpreted as a mask with multiple slits and an array of discrete slits), or visa versa. In either case, the digital lock-in techniques outlined earlier may be applied.

A more detailed description of various arrangements for detecting the light passed by the multislit template or mask mounted on the torsion column is contained in the U.S. patent application Ser. No. 08/838,298 previously incorporated herein by reference. The torsion column embodiment may be configured such that the light passing through each slit is detected by a separate photomultiplier or photodiode, or such that the light from a group of slits or from all the slits is detected with an integrating sphere coupled to one detector.

Although the invention has been described in terms of detecting the emission spectra of a substance, the invention may be applied to detecting the absorption spectra of a substance.

While the invention herein disclosed has been described by means of specific embodiments and applications thereof, numerous modifications and variations could be made thereto by those skilled in the art without departing from the scope of the invention set forth in the claims.

What is claimed is:

1. Apparatus for providing one or more electrical signals representing a measurement of spectral similarity between an emission spectrum from a light source and a reference spectrum, comprising:

an optical instrument that spectrally disperses an optical signal, in a dispersion direction that lies substantially in a dispersion plane, such that spectral components of the optical signal are projected and imaged onto an image region oriented perpendicular to the dispersion plane with the spectral components resolved along the dispersion direction;

a template, herein defined as a plurality of transmissive slits which may be individual assemblies or part of a mask, that is located in the image region, wherein the transmissive slits are located along the dispersion direction at (i) positions that encode the reference spectra or (ii) at regularly-spaced intervals that span a continuous portion or the entirety of the image region;

a driver that induces relative movement in the dispersion direction between the optical signal's imaged components in the image region and the template located in the image region, or visa versa;

a plurality of electro-optical sensors, less than or equal in number to that of the transmissive slits, which are responsive to light from the spectral components passing through the transmissive slits, each electro-optical sensor providing an electrical signal representing intensity of light passing through respective transmissive slits optically coupled to respective sensors;

a plurality of signal conditioning circuits which (i) transmit the electrical signals generated by the plurality of electro-optical sensors faithfully over a frequency range $\omega$–$(N/2)\omega$, where $\omega$ is a frequency of relative movement induced by the driver and $N\omega$ is a sampling frequency with which the electrical signal generated by each electro-optical sensor is converted, respectively, to a digital signal, and (ii) attenuate the electrical signals outside the frequency range;

a digital control and data acquisition system containing (i) both output channels and input channels, the former of which are used to output a sinusoidal waveform at a frequency $\omega$ to the driver and the latter of which are used to sample at a frequency $N\omega$ the electrical signals and store the respective digital signals in memory, (ii) a single master clock to permit setting a ratio of sampling frequency and oscillation frequency, $N$, to an integral value with high precision, or separate master clocks for the output and input channels in which the period of their beat frequency is long compared with the duration of data collection with the active spectrometer, and (iii) a data processing capability wherein the digitally stored data from successive periods at the frequency of relative movement $\omega$ is averaged together, thereby reducing a level of noise relative to that of the electrical signals in a spectral interval spanned by the relative movement of the spectral components in the image region and the template located in the image region.

2. Apparatus for providing a spectral measurement as defined in claim 1, wherein:

the image region is circularly curved and the optical signal's spectral components are imaged along an arc of the image region corresponding to the dispersion direction; and the transmissive slits have a height as large as 10 millimeters perpendicular to the arc and are distributed over a useful length of about 140 millimeters along the arc.

3. Apparatus for providing a spectral measurement as defined in claim 1, wherein:

the image region is circularly curved and the spectral components are imaged along an arc of the image region corresponding to the dispersion direction; and the transmissive slits have a height as large as 10 millimeters perpendicular to the arc and are distributed over a useful length of about 250 millimeters along the arc.

4. Apparatus for providing a spectral measurement as defined in claim 2 or 3, wherein:

the transmissive slits have a width between 10 microns and 200 microns; and the relative movement displaces the spectral components with respect to the transmissive slits over a distance between one and a hundred times the width of the transmissive slits.

5. Apparatus for providing a spectral measurement as defined in claim 2 or 3, wherein:

the driver comprises (i) a torsion column, (ii) a platform mounted on the torsion column including an inertia ring that largely defines a resonant frequency of a system comprising the platform and torsion column, (iii) the template mounted on the platform, and (iv) an electro-mechanical vibrator attached to the platform for oscillating the template at the resonant frequency of the system;

the transmissive slits having a width between 10 microns and 200 microns; and the relative movement moving the template with respect to the spectral components over a distance between one and a hundred times the width of the transmissive slits in the dispersion direction.

6. Apparatus for providing a spectral measurement as defined in claim 1, wherein:

the image region is flat and the optical signal's spectral components are imaged along a straight line of the image region corresponding to the dispersion direction; and the transmissive slits have a height perpendicular to the straight line as large as (i) 50 millimeters in the case of curved slits and (ii) 20 millimeters in the case of straight slits and may be distributed across a useful focal plane width of a 10 to 20 millimeters; and the driver comprises a glass refractor plate or a planar mirror located within the optical instrument in a path of the optical signal; and the relative movement displaces the spectral components, along the dispersion direction, with respect to the template.

7. Apparatus for providing a spectral measurement as defined in claim 6 wherein:

a plurality of sources are imaged on, or fiberoptically coupled to an entrance slit such that light from the plurality of sources is distributed spatially along a height of the transmissive slit, and respective spectral components due to each of the plurality of sources are optically coupled to a set of sensors, respective electrical signals of which are independently conditioned and recorded by the data acquisition system.

8. Apparatus for providing a spectral measurement as defined in claim 1, wherein:

the reference is acquired through the apparatus and digitally stored in the digital control and data acquisition system, thereby incorporating (i) a convolution of an instrumental profile of the apparatus with intrinsic profiles of emission features in the light source and (ii) relative intensities, corrected for a wavelength-dependent response function, of emission features in the light source that fall within a spectral scan range of the relative movement and (iii) relative intensities, corrected for the wavelength-dependent response function, of emission features in the light source that are detected by the plurality of electro-optical sensors coupled to the transmissive slits that are widely separated in wavelength, and a least-squares fit of the reference spectrum to the digital signals is performed to find a concentration of a sought element in a spectrum of the light source.

9. Apparatus for providing a spectral measurement as defined in claim 5 wherein:

a plurality of sources are imaged on, or fiberoptically coupled to an entrance slit such that light from the plurality of sources is distributed spatially along a height of the transmissive slits; and respective spectral components due to each of the plurality of sources are optically coupled to a set of sensors, respective electrical signals of which are independently conditioned and recorded by the digital control and data acquisition system.

10. Apparatus for providing a spectral measurement as defined in claim 6 wherein:

a plurality of sources are imaged on, or fiberoptically coupled to an entrance slit such that light from the plurality of sources is distributed spatially along a height of the transmissive slits; and respective spectral components due to each of the plurality of sources are optically coupled to a set of sensors, respective electrical signals of which are independently conditioned and recorded by the digital control and data acquisition system.

11. Apparatus for providing spectral measurement as defined in claim 1 wherein external optics comprise:

an entrance slit; and imaging optics for directing an optical image into a plane tangent to a spectrometer's Rowland Circle, to the imaging optics including an oscillating mirror coupled to the driver, the mirror moving the optical image back and forth across the entrance slit, the entrance slit being in the plane wherein the spectral components are respectively displaced along the dispersion direction.

12. An active spectrometer comprising:

dispersion device selected from the group of devices consisting of diffraction gratings and prisms;

a focal plane defined by an emission spectrum dispersed from the dispersion device in response to light directed onto the dispersion device;

means for defining a target spectrum comprising wavelengths of light associated with at least one target substance;

means for inducing a relative oscillatory movement in a dispersion direction between the means for defining a target spectrum and the emission spectrum, the relative oscillatory movement being at a first oscillation frequency;

a detector position receiving light at the focal plane;

an analog-to-digital converter, coupled to the detector position, sampling light received at the detector position, the sampling being at second oscillation frequency, wherein the second oscillation frequency is an integral multiple of the first oscillation frequency.

13. The active spectrometer of claim 12 wherein said means for defining a target spectrum comprises an optical mask.

14. The active spectrometer of claim 13 wherein said means for inducing a relative oscillatory movement comprises means for oscillating said optical mask.

15. The active sepctrometer of claim 14 wherein said means for oscillating said optical mask comprises:

a torsion column;

a platform coupled to the torsion column and to the optical mask; and an oscillator coupled to the platform for inducing an oscillatory movement to the platform.

16. The active spectrometer of claim 12 wherein said means for defining a target spectrum comprises a plurality of discrete detector positions.

17. The active spectrometer of claim 12 wherein said means for defining a target spectrum comprises a digitally stored representation of the target spectrum.

18. The active spectrometer of claim 12 further comprising a processor coupled to the analog-to-digital converter, the processor comprising:

means for determining presence or absence of the target substance in response to a digital signal generated by the analog-to-digital converter.

19. The active spectrometer of claim 18 further comprising:

a high pass filter interposed between said detector position and said processor, wherein said high pass filter filters background light from the digital signal generated by the analog-to-digital converter.

20. The active spectrometer of claim 19 wherein said means for defining a target spectrum comprises a digitally stored representation of the target spectrum, and wherein said means for determining comprises means for performing a least squares fit of said digital signal to said digitally stored representation of the target spectrum.

21. The active spectrometer of claim 12 wherein said active spectrometer further comprises:

a mirror for directing said light onto the dispersion device.

22. The active spectrometer of claim 21 wherein said means for inducing a relative oscillatory movement comprises means for oscillating said mirror.

23. The active spectrometer of claim 22 wherein said means for oscillating said mirror comprises a galvanometer.

24. The active spectrometer of claim 22 wherein said means for oscillating comprises an audio frequency oscillator.

25. A method of active spectrometry comprising:

dispersing light;

defining a focal plane with an emission spectrum dispersed from a dispersion device in response to the light;

defining a target spectrum comprising wavelengths of light associated with at least one target substance;

inducing a relative oscillatory movement in a dispersion direction between the target spectrum and the emission spectrum, the relative oscillatory movement being at a first oscillation frequency;

detecting light of the emission spectrum at a detector position at the focal plane; and sampling light received at the detector position, the sampling being at second oscillation frequency, wherein the second oscillation frequency is an integral multiple of the first oscillation frequency.

26. The method of claim 25 wherein said defining of said target spectrum comprises defining slits in a optical mask.

27. The method of claim 25 wherein said defining of said target spectrum comprises positioning a plurality of discrete detector slits.

28. The method of claim 25 wherein said defining of said target spectrum comprises digitally storing a representation of the target spectrum.

29. The method of claim 25 further comprising determining presence or absence of the target substance in response to said sampling of said light received at said detector positions.

30. The method of claim 29 further comprising:

filtering background light from samples generated in response to said sampling.

31. The method of claim 30 wherein said defining of said target spectrum comprises digitally storing a representation of the target spectrum defining a target spectrum, and wherein said determining comprises performing a least squares fit of said samples to said digitally stored representation of the target spectrum.

32. The method of claim 31 further including directing said light onto a diffraction grating using a mirror.

33. The active spectrometer of claim 32 further including oscillating said mirror so as to induce said relative oscillatory movement.

* * * * *

UNITED STATES PATENT AND TRADEMARK OFFICE
CERTIFICATE OF CORRECTION

PATENT NO. : 5,963,320
DATED : October 5, 1999
INVENTOR(S) : Brooks, et al.

It is certified that error appears in the above-identified patent and that said Letters Patent is hereby corrected as shown below:

Claim 6, column 17, line 5, after "of" delete "a". Claim 8, column 17, line 26, after "reference" insert --spectra--.

Signed and Sealed this

Twenty-third Day of May, 2000

Attest:

Q. TODD DICKINSON

Attesting Officer

Director of Patents and Trademarks